July 2, 1935.  A. SWENSON  2,006,490

DELIVERY AND TRANSFER MECHANISM

Filed Jan. 24, 1934  6 Sheets-Sheet 1

INVENTOR
ALBIN SWENSON
BY Percy Freeman
ATTORNEY

July 2, 1935.  A. SWENSON  2,006,490

DELIVERY AND TRANSFER MECHANISM

Filed Jan. 24, 1934   6 Sheets-Sheet 5

INVENTOR
ALBIN SWENSON
BY
ATTORNEY

Patented July 2, 1935

2,006,490

UNITED STATES PATENT OFFICE 2,006,490

DELIVERY AND TRANSFER MECHANISM

Albin Swenson, New York, N. Y.

Application January 24, 1934, Serial No. 708,019

12 Claims. (Cl. 214—95)

The present invention relates to apparatus for transferring from one level to another selected level, merchandise in the form of bottles of milk, packages of food, and the like; and, particularly to a dumb-waiter where the basement level serves as a station at which the bottles or packages are placed in the dumb-waiter car, the said car then being raised to an upper selected level at which time mechanism is brought into play to transfer said bottles or packages to receiving means at that level.

At present, and as particularly pertaining to the delivery of milk in bottles, which delivery takes place during the night, the milk man must load a tray which he then carries with him to the doors of the various homes or apartments where he deposits upon the floor the previously determined number of bottles. As especially relating to delivery in apartment houses, he is often required to make many trips back to the vehicle from which he fills his tray, and having to walk, as is often the case, many steps of stairs, considerable time is lost in making his deliveries. Also having to set the bottles upon the floor, which is not in every case clean, and leaving them exposed to possible theft, the delivery of milk, as at present constituted, has, in addition to the faults here mentioned, several others which need not be mentioned here.

The present invention, therefore, contemplates the provision of means preferably in the form of a dumb-waiter whereby milk or the like may be deposited from one station to receiving means contiguous to the apartment to which such delivery is to be made.

The invention also contemplates means whereby the number of articles or bottles desired by the occupant of the apartment may be read by the person making the delivery, on an indicator or by means of signal lights or the like.

More specifically, the invention has for its major object, the provision of a dumb-waiter having a car movable from one level to a selected upper level, said car having removable means receptive of an article such as a bottle of milk, and means at each of the other levels to receive the said car carried means, the dumb-waiter also being provided with means to transfer the car carried means from the car to the receiving means at the selected level.

Another object of the invention is to provide means carried by the car, which are operable by mechanism preferably located at the bottom of the dumb-waiter shaft to effect the transfer of the article receiving means from the car to the receiving means at a selected upper level.

A still further object resides in the provision of pre-settable means whereby, in the event of plural transfer means in each car, one or more of said transfer means is operated simultaneously.

The foregoing and many other objects of the invention will be more clearly apparent from the following detailed specification, descriptive of the accompanying drawings, which illustrate preferred embodiment of the invention and, in which.

Referring to the drawings in greater detail, the shaftway is shown at 20, and is provided with guides 21 for the car 22. The loading level is indicated at 23, and an upper or transferring level at 24. Though only one such transfer level has been illustrated, it is readily apparent that the apparatus may be constructed to serve two or more such levels. The car 22 is counterweighted as at 23′, and connections are made from the counterweight to the bottom of the car as at 24′, and from the counterweight to the top of the car as at 25. The latter connection, may be in the form of a cable or rope trained about sheave 26 located at the top or head of the shaft and the former is preferably in the form of a chain.

As here illustrated, the car may be raised and lowered by means of a handle or crank 27, and through means of the sprocket 28 and chain 29 a drive is effected to the sprocket 30, the shaft 31, the gearing 32, and the shaft 33. Upon the latter shaft, there is mounted a sprocket 34 about which the lower bight of the chain 24′ is trained. To compensate for possible stretch in the chain 24′ or the cable 25, means such as the pivoted cross arms 35, is provided at the connection between the counterweight 23 and the cable 25. One end of each of these arms is pivotally connected to the counterweight and the other ends, each connected to a wire or cable 36 having a cross-head portion 37 below the counterweight. The upper end of the chain 24 is connected to the center of the cross-head. In this manner, slack due to stretch is taken up in the chain 24 and cable 25, so that the car will always have a definite position in relation to its driving means.

The shaft 32 has keyed thereon, a drum 38 which at one face is provided with a threaded projection 39 adapted to engage a screw seat in a fixed frame bracket 40. The drum 38 is preferably provided on its periphery with a recess 41 adapted to be entered by a pin 42 on the end of the arm 43. The arm 43 is mounted to rock with or around the stub shaft 44 and another curved arm 45 is arranged to move with the arm 43 in the manner of a bell crank. This arm 45 is preferably provided with a lug 46 engageable in a cam notch 47 of a disc 48. This disc on one face may also be provided with a pin 49 adapted to engage against a portion of an over-standing finger 50 formed on the arm 45.

The disc 48 is preferably carried on a rock shaft 51 having means such as the hand wheel 52, whereby it may be manually manipulated. A cross shaft 53 may be driven from the shaft 51 by means such as a gearing 54. One end of the shaft 53, which is supported in the brackets 55 and 56, is provided with an enlargement in the form of a collar 57. To one side of the said enlargement there may be positioned a gear 58 freely mounted on the shaft 53, and on the other side of the enlargement there may be similarly mounted another gear 59. The gear 58 carries a pawl 60 adapted to engage a notch 61 in the enlargement 57, and is provided with an outstanding tail portion 62 and a somewhat similar but shorter head portion 63. The bracket 57 may be provided with respective stops 64 and 65 for the mentioned tail portion 62 and head portion 63.

The gear 59 is preferably provided with the pawl 66 similar to the pawl 60, the tail portion 67 and the head portion 68 which are adapted to respectively cooperate with stops 69 and 70, carried by the bracket 56. A notch 71 in staggered relation with the notch 61 is provided on the enlargement 57 for the pawl 66.

The gear 58 is arranged to mesh with a rack 72 which is also provided with teeth 73 engageable with mutilated pinions 74 and 75. These pinions are provided with central bores through which may slide the respective vertical racks 76 and 77. These racks are also keyed to their respective pinions so that rotation of the pinions will rotate the racks 76 and 77 also permitting vertical movement of the said racks through the bores of the pinions by means of rotation of the gear 59.

The racks 76 and 77 at their upper ends, are respectively provided with extensions in the form of the rods 78 and 79. These rods extend to the full height of the shaftway and may be journaled at their upper ends in means such as the bracket 80. The rod 78 is preferably provided with a finger-like projection 81 and the rod 79 is similarly provided with the projection 82 for each upper level of the shaftway.

Figure 6:
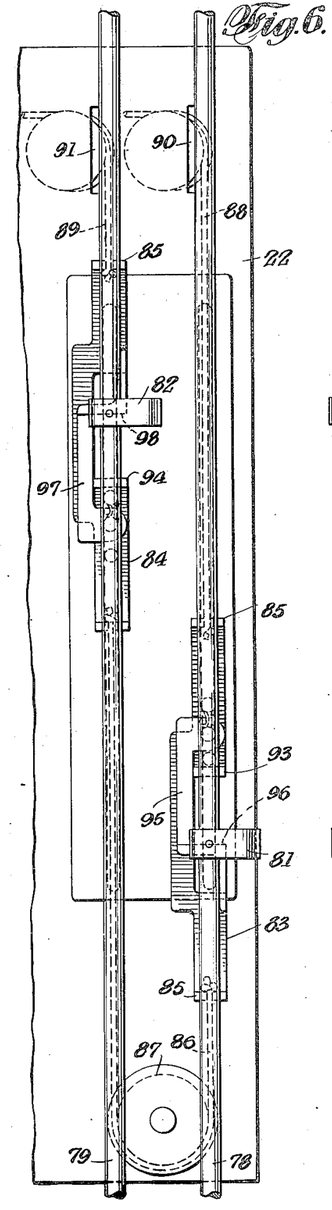
Fig. 6 is an elevational view of that side of the car which carries the intermediate apparatus, and which is moved by the mechanism illustrated in Figs. 3, 4, and 5 for finally moving the transfer means.
Figure 7:
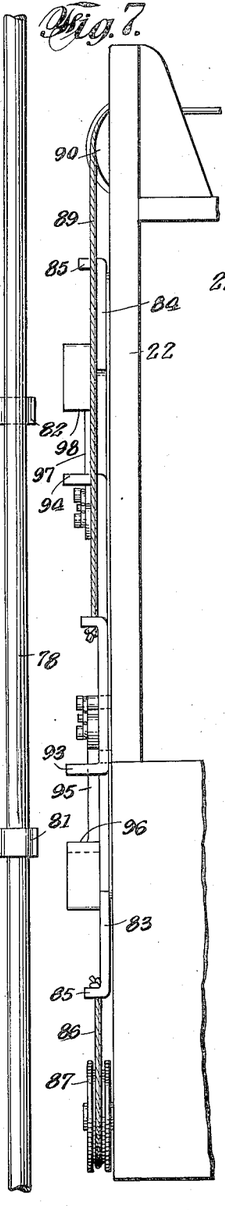
Fig. 7 is a rear view of the part shown in Fig. 6.
Figure 8:
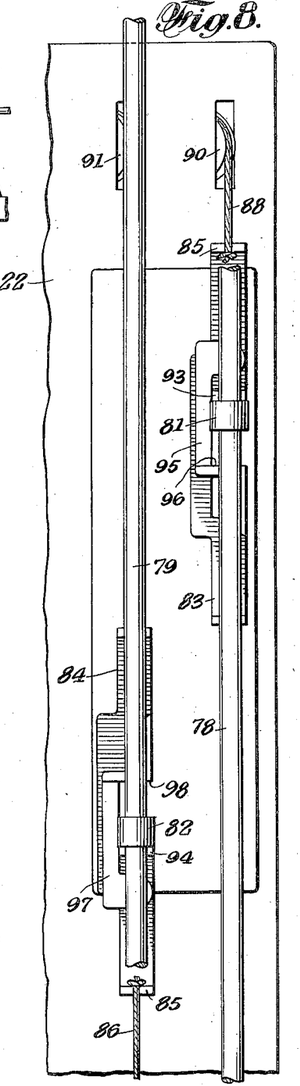
Fig. 8 is a view similar to Fig. 6 but with the parts moved after transfer has taken place.
Figures 9, 10, 11, 12, 13, 14, 15, 16:
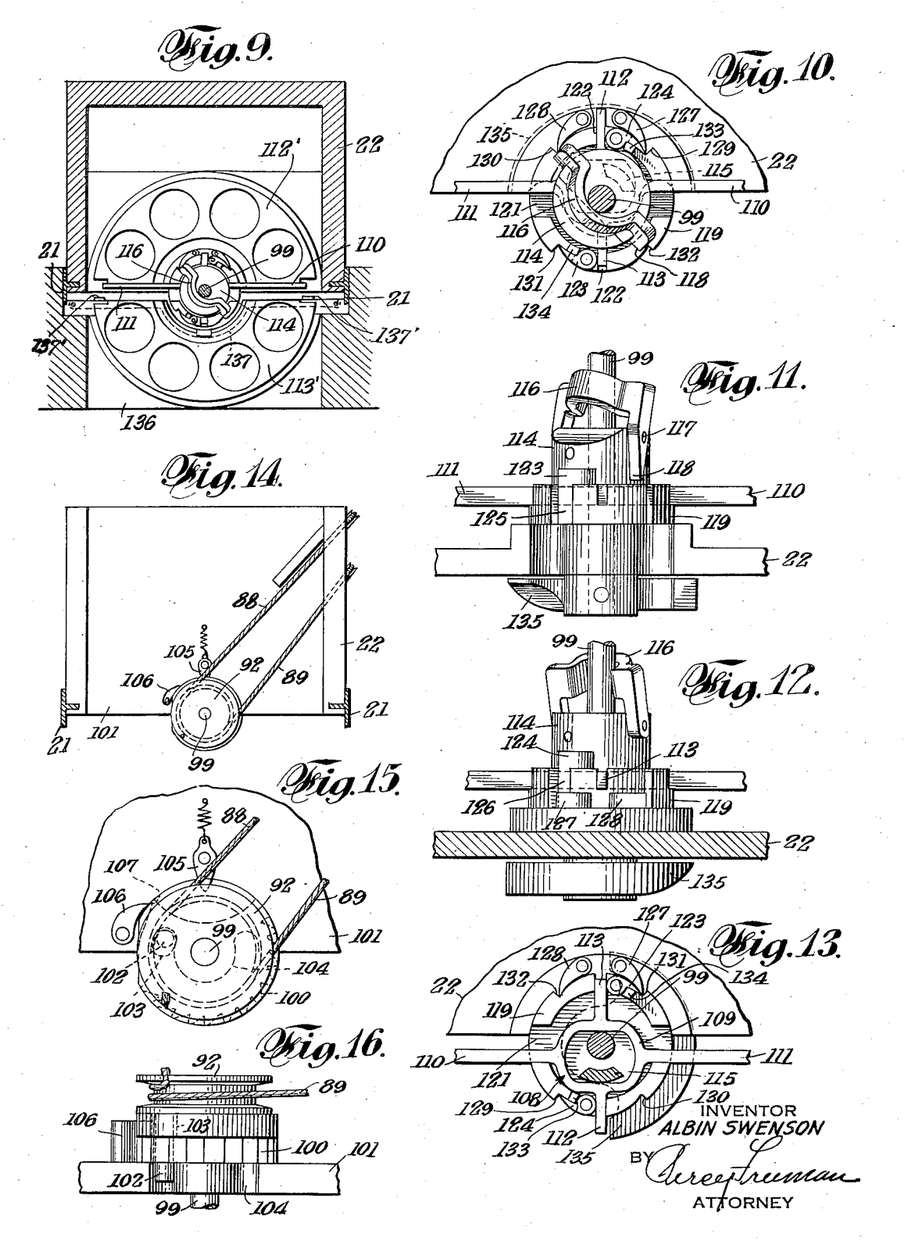
Fig. 9 is a plan section of the car as stationed at one of the receiving levels.
Fig. 10 is a fragmentary plan detail of the car transfer means.
Fig. 11 is a front elevational view of the same.
Fig. 12 is a rear elevational view of the mechanism shown in Figs. 10 and 11.
Fig. 13 is a plan sectional view similar to Fig. 10, and showing the transfer means at the completion of one-half of its cycle.
Fig. 14 is a top plan view of the car showing the means ultimately driven from the parts shown in Fig. 6 and finally driving the mechanism shown in Fig. 10.
Fig. 15 is a fragmentary plan detail of the means shown in Fig. 14.
Fig. 16 is an elevational view of the means shown in Fig. 15.

The car 22 is provided with means which may be engaged by these projections 81 and 82 for transmitting the reciprocatory motion of the racks 76, 77 to the transfer mechanism. One manner for accomplishing this is best illustrated in Figs. 6, 7, and 8, and includes brackets 83 and 84 adapted to slide vertically against the side of the car. The bracket 83 which is adapted to be moved by the finger 81 and the bracket 84 similarly movable by the finger 82, are each provided at their upper and lower ends with outstanding lug portions 85. The lower lugs 85 serving as anchoring means for opposite ends of a cable or rope 86 trained about a pulley 87 rotatably mounted on the side of the car. The upper ends 85 of the brackets 83, 84 are each respectively connected to cables 88, 89 bent around pulleys 90, 91, and then fixedly anchored to a flange of a pulley 92 loosely mounted at the top of the car. The bracket 83 is provided with a lug 93 adapted to engage the top face of the finger 81 when that finger is moved upwardly and similarly the bracket 84 is provided with a lug 94 engageable by the lower face of the finger 82 when it is moved downwardly. The bracket 83 is also provided with a pivoted spring tensioned arm 95 having an abutting face 96 for the lower face of the finger 81 and a similar spring tensioned arm 97 having an abutting face 98 for the upper face of the finger 92 is provided with the bracket 84. The last mentioned arms 95 and 97 are mounted to swing out of the way by contact with their respective fingers 81, 82 so as to permit these fingers to be aligned with their respective lug portions 93, 94, in the event that stretch, expansion due to heat or other factors should disturb the previously arranged relation between the fingers and the lugs. This condition is best illustrated in Fig. 6, where it will be seen that upon rotation of the fingers to the position shown in Fig. 8, the fingers will strike their respective arms swinging them momentarily to the left and then as reciprocatory motion is imparted to the rods 78 and 79, these arms will right themselves and resume their initial position as best seen in Fig. 8.

Figure 19:
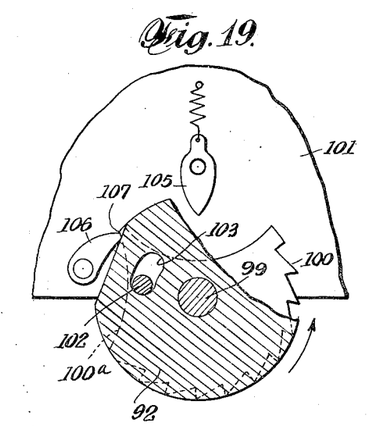
Figs. 19, 20 and 21 are fragmentary plan details of the means shown in Figs. 14, 15 and 16 and drawn to an enlarged scale and showing the parts in various positions during their movements.
Figure 20:
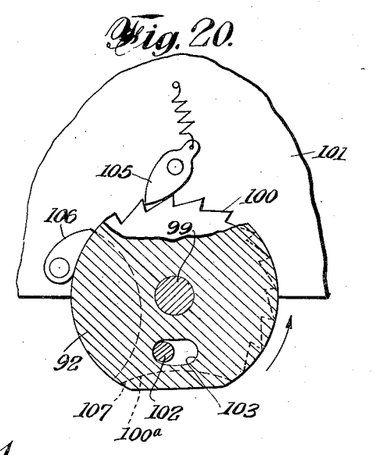
Figure 21:
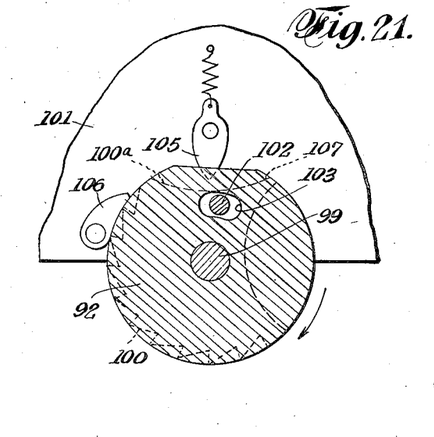

The reciprocatory movement of the rods 78 and 79 being imparted to the cables 88 and 89, rotation is given to the pulley 92 freely mounted on the shaft 99. The mutilated ratchet 100 is fixed to the shaft 99, and is positioned on the car shelf 101 in which the shaft 99 is journaled. The ratchet 100 is provided with a pin 102 protruding through a lost motion slot 103 in the pulley 92, and extending to engage what may be termed an arcuate slot 104 in the shelf 101. A spring positioned dog 105 is adapted to engage with the teeth of the ratchet 100, to prevent counter-rotation of the shaft 99 until it had been given at least a rotation of approximately 300°. At this time the dog 105 will assume a straightened position in the cut away portion 100ᵃ in the ratchet 100 so the pulley 92 may be reversely rotated from the position in Fig. 21 to its initial position shown in Fig. 19, the dog 105 during this action being disposed oppositely to the position shown in Fig. 20. To prevent unauthorized or inadvertent rotation of the shaft 99, a safety dog 106 is adapted to engage against the shoulder 107 on the mutilated ratchet 100, (Fig. 19) this dog being moved out of engagement with said shoulder (Fig. 20) upon initial rotation of the pulley 92 in the direction of the arrow, and thereafter the pin 102 may drive the ratchet through contact with the forward portion of the slot 103.

The movements of the slide brackets 83 and 84 are designed to impart to the shaft 99 rotation in one direction of about 300° and then counter-rotation of the same amount. This rotation of the shaft 99 is utilized to progressively rotate the transfer member 108 which comprises a central flattened ring portion 109, provided with transfer arms 110, 111, and shorter guide arms 112, 113.

The transfer member 108 is adapted to be rotated 180° and then to be moved from the front to the back during the counter-rotation of the shaft 99. The arms 110, 111 are adapted during their rotational movement, to respectively slide a tray 112' from the car to the receiving means and to slide a tray 113' from the receiving means to the car.

Figs. 9, 10, 11, 12, 13, best illustrate one manner in which this may be accomplished. A collar 114, fixed to the shaft 99, is provided at its lower end with a lug 115 which is engageable with the transfer member at the flattened ring-like portion 109. The collar 114 is provided with a pre-settable gravity bail 116 pivoted at 117 and provided with a lower extension 118 at one side. The transfer member is positioned to move in a rotating freely mounted collar 119, which is hollowed for the flattened ringlike portion 109 and slotted at 121 to permit movement of the transfer arms 110 and 111, and further slotted at 122 to guide the shorter arms 112, 113. This collar 119 carries opposed spring pressed pawls 123, 124, each being respectively provided with downreaching tail portions 125, 126. These tail portions may alternately be engaged by a spring pressed dog 127, a similar dog 128 being disposed in opposite relation to the dog 127. The collar 119 is provided with the stop shoulders 129, 130, 131, 132, and is also provided with diametrically opposed upstanding projections 133, 134. The last mentioned projections are ultimately engageable by the tail 118 of the bail 116 to impart rotation to the collar 119 and so to the transfer member 108.

The lower end of the shaft 99 has affixed thereto a car steadying and positioning cam 135 which is adapted to protrude itself between the shelf 136 and the member 137, which is tensioned by means such as the springs 138.

Figure 1:
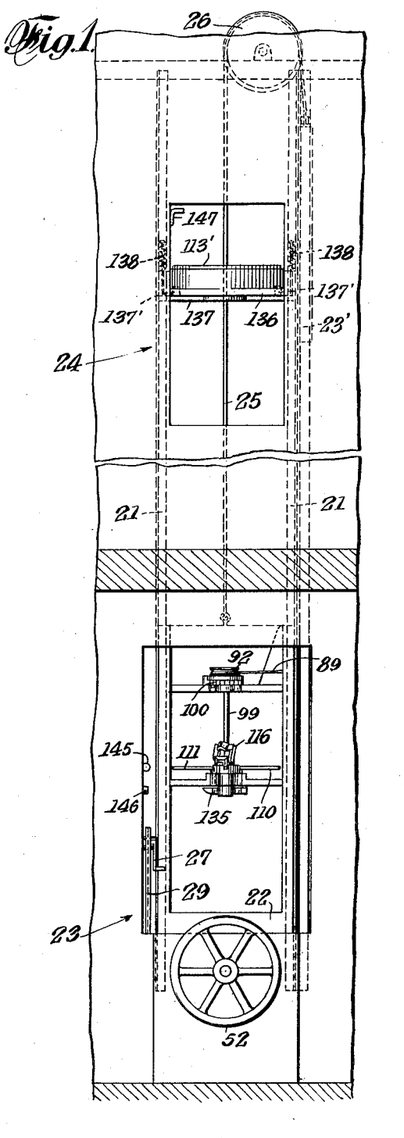
Fig. 1 represents, in front elevation, a dumb-waiter constructed in accordance with the present invention and in which a loading level and one receiving level are shown.

The member 137 is provided at each end adjacent to the inner edge of the shelf 136, with upstanding lugs 137'. When the member 137 is moved downwardly by the cam 135, the tops of these lugs are brought to a position below the top of the shelf and a tray may be slid from the car to the shelf and vice versa. When the member 137 is returned to the position shown in Figs. 1 and 2, these lugs serve to act against the chordal faces of the tray on the shelf to prevent inadvertant displacement thereof.

Figure 17:
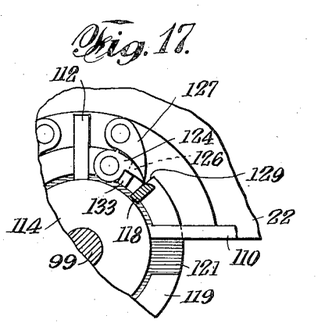
Figs. 17 and 18 are fragmentary plan details of the car transfer means shown in Figs. 10–13 inclusive and drawn to enlarged scale.
Figure 18:
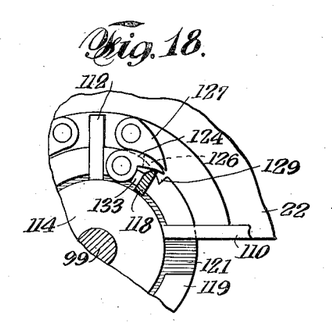

As can be seen from the foregoing, counter-clockwise rotation of the shaft 99 will bring the tail 118 against the near face of the pawl 124 as best seen in Fig. 17 rocking it outwardly as seen in Fig. 18 so that its downreaching tail portion 126 will also rock the dog 127 outwardly and away from the shoulder 129. The leading face of the tail 118 will now abut against the upstanding projection 133 to impart its rotation to the sleeve 119 and the transfer member 108. After 180° of rotation of that sleeve, the parts will assume the position shown in Fig. 13 with the dog 127 now engaging against the shoulder 131, the other dog 128 now having engagement with the shoulder 132. It will be noted that in this position the transfer member has been moved forward so that the tray 113' on the transfer shelf 136 may be properly positioned out of the path of any portion of the car. Now as the shaft 99 rotates clockwise, the lug 115 serves to retract or move back the transfer member to similarly align and position the tray which had been transferred from the shelf to the car. In this position the parts are again ready to be operated.

In the event of a plural number of transfer devices which may be simultaneously operated by common mechanism not in all cases will it be desirable to effect such a transfer. In that event, the bail 116 of that transfer device which is not to operate, is swung down so its tail 118 may be out of path of the members it is intended to operate against, and in this wise no rotation is imparted to that particular transfer member.

The ratchet 100 is provided so that the full cycle of operation of the transfer arms must be completed before the shaft 99 can be re-rotated in the clock-wise direction.

So that the operator may be apprised of the position of the car in relation to a selected upper level, there is provided at 139 a member provided with graduations 140 each indicative of the position of the car at a certain level and readable with the index mark 141. As the car is raised in the shaftway, the rotation of the shaft 33 which carries a worm 142 imparts to the gear sector 143, the slow rotation to the member 139 necessary to bring one of the graduation marks 140 in line with the indexed point 131 at the time the car is at a certain level.

Figure 5:
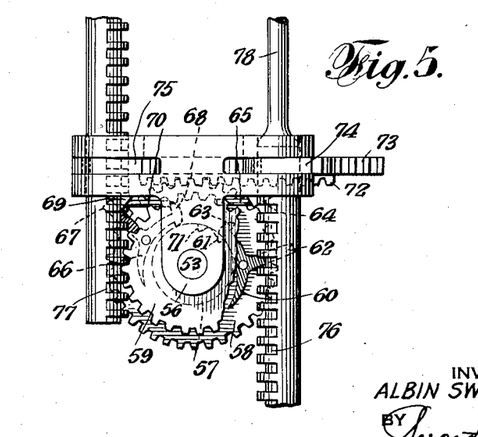
Fig. 5 is a side elevational view of that portion of the mechanism shown in Figs. 3 and 4, which forms the final driving means for the car carried mechanism.

When the apparatus is ready for operation, the car 22 is provided with a tray 112', each of the levels which are to receive a delivery are each provided with a tray 113'. Assuming in this case, that bottled milk is to be delivered, the required number of bottles are placed in cavities in the tray 112. The operator then turns the handle 27 to elevate the car and watches the graduations 140 until the proper one aligns with the indexed point 141. This indicates to him that the car is at the proper level. He then rotates the hand wheel 52 which first, by means of the cam notch 47 acting against the lug 46, rocks the bell crank lever 43—45 so the projection 42 seeks the hole 41 in the drum 38. Continued rotation of the hand wheel imparts through the medium of the shaft 51 and the gearing 54, imparts rotation to the shaft 53. The enlargement of the shaft 53, through the medium of its notch 61 carries the pawl 60 in counterclock-wise direction. In this manner since the pawl 60 is carried by the gear 58 the rack 72—73 moves toward the left (Fig. 5) to cause partial rotation of the rods 78 and 79.

When the pawl 60 has been moved a sufficient amount to cause the rocking of these rods, its tail 62 engages against the fixed stop 64 to free the pawl from the driving action of the shaft 53 and thereafter for the continued rotation of that shaft the gear 58 remains stationary. Immediately after the rods are so partially rotated, the head 68 of the pawl 66 finds the notch 71 in the enlargement on the shaft 53 and rotation, because the pawl is carried by the gear 59, is imparted to that gear. This rotation oppositely reciprocates the racks 76 and 77 and the rods 78 and 79. The slides 83 and 84 respectively cooperative with the rods 78 and 79 are in this manner moved in opposite directions; that is, the slide 83 is moved upwardly, and the slide 84, downwardly (see Fig. 8).

Through the medium of the cables 88 and 89, the pulley 92 is therefore given a rotation in one direction somewhat less than 360°. This rotation is imparted to the shaft 99 through the medium of the pin 102 or the pulley and the slot 103 on the ratchet wheel attached to that shaft. The rotation of that shaft, in this case, counterclockwise, causes the tail 118 of the bail 116 to first raise the dog 127 away from its shoulder 129 and then to engage against the lug 133 to drive the collar 119 in the said counterclock-wise direction. The arm 110 will then engage against one of the chordal faces of the tray 112' to slide it from its position in the car to the shelf 136 and the arm 111 will similarly engage one of the chordal faces of the tray 113' to slide it from the shelf 136 to the car. Upon the completion of the half revolution in the counterclock-wise direction of the arms they will assume the position shown in Fig. 13, the transfer of the trays having been effected.

To insure that no portion of the tray 112' protrudes into the path of the car, the opposite or clock-wise direction of the shaft 99 now through the medium of the cam lug 115 slides the transfer member and its arms back to the position shown in Fig. 10, where it is again ready for another cycle of operation. So the car 22 may be maintained in its proper relation to the selected level, the cam 135 protrudes itself between the bottom of the shelf 136 and the spring tensioned member 137, this also prevents movement of the car in the shaft, should the parts not be returned to their normal position after the transferring cycle. It will of course be apparent that opposite movement of the hand-wheel after the transfer has been effected, is necessary to reset all the parts to their initial positions so they may be ready to again perform their functions.

It will be noted that the drum 138 is so mounted with particular reference to the screw 39 so as to prevent the entrance of the lug 42 into the hole 41 at any time other than when the car is at one of the upper levels. The screw serves to move the drum 38 endwise and therefore, moves the hole 41 out of alignment with the lug 42 when the car is in an in-between position with relation to the upper levels.

While in this case only one upper level has been illustrated, it is of course apparent that several such levels may be provided and also that at each level several receiving trays may be provided, the car of course being also provided with a similar number of transferring devices. When the latter is the case, transferring of the trays may be effected at the will of the operator by setting those of the bails 116 which relate to the particular transfer devices he wishes to operate.

It is also contemplated that doors individually entering on each shelf adapted to be locked and opened only by authorized persons may be provided against possible theft of the delivered merchandise.

Figure 2:
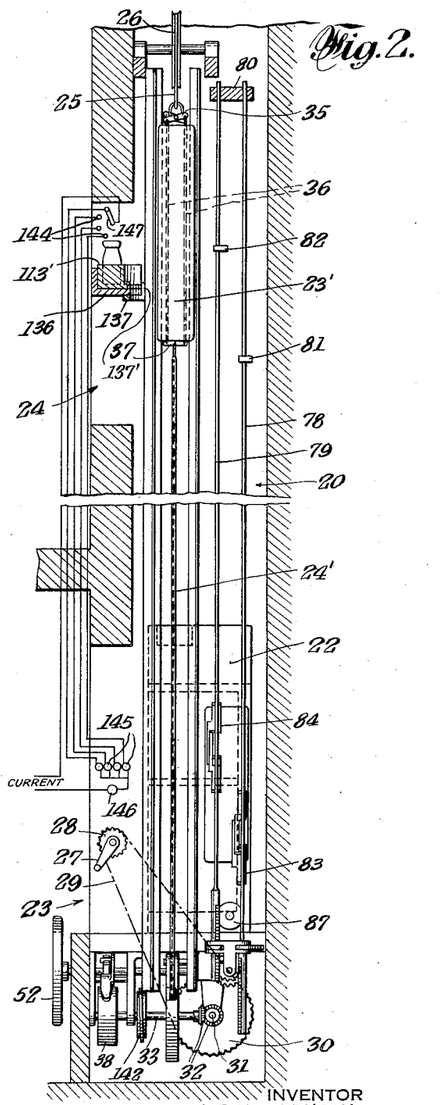
Fig. 2 is a side elevation of the same, the dumb-waiter shaft being shown in section.
Figure 3:
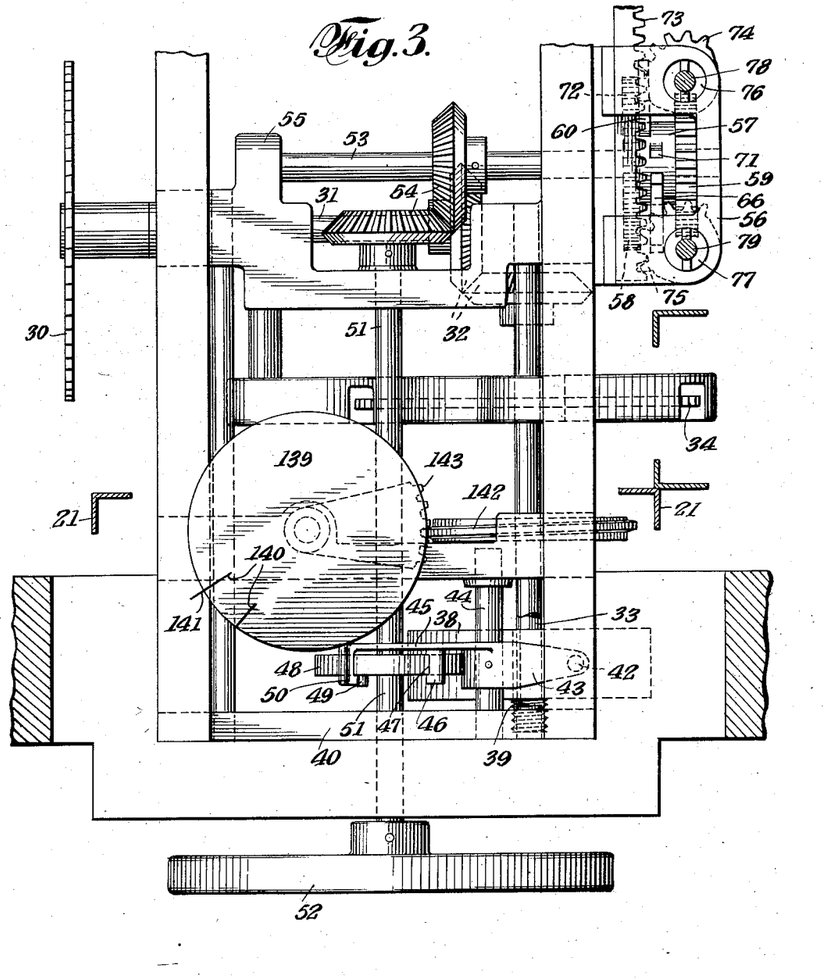
Fig. 3 is a plan view of an enlarged scale of the mechanism at the bottom of the dumb-waiter shaft for driving the transfer means carried by the car.
Figure 4:
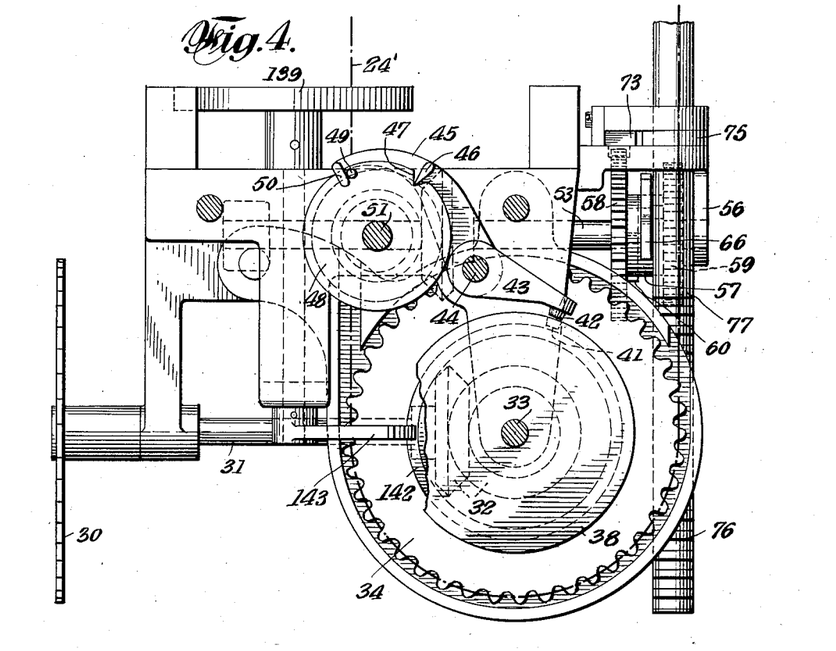
Fig. 4 is a front view of the mechanism shown in Fig. 3, the front bracket of which has been removed for the purpose of clarity.

Arrangements may be made to apprise the persons making delivery, the requirements of the tenant or home owner. One method by which this may be accomplished is illustrated in Fig. 2, and comprises a plurality of switch contacts 144 in electrical circuit with one side of tell-tale lamps 145 at the basement level. The other side of each of these lamps are preferably in circuit, through a switch 146, with one leg of the line current, the other leg of the line current being connected to an arm 147 adapted to be contacted with any one of the contacts 144. In this manner, the potential receiver of the merchandise, as in this case bottles of milk, may set the arm 47 on one of the contacts 144 to designate what his or her requirements may be and the person making delivery, upon pushing the switch 146, may determine by which one of the lights illuminate, what those requirements are. Of course, for a plurality of upper levels the arrangement would be similar for each level.

Although I have described my improvements with considerable detail and with respect to a certain particular form of my invention, I do not desire to be limited to such details since many changes and modifications in the form, arrangements, proportions, and sizes thereof, may well be made without departing from the spirit and scope of my invention in its broadest aspect.

Having thus described my invention, what I claim as new and desire to secure by Letters Patent, is:

1. In a dumb-waiter, a car movable from one level to another in the shaftway thereof, means carried by said car and receptive of an article, means at each level to receive the car carried means and means to transfer said car carried means from the car to the receiving means at each level selectively, said transfer means including a rotating member for effecting a simultaneous transfer of the car-carried means to the receiving means and from the receiving means to the car.

2. In a dumb-waiter, a car movable from one level to another in the shaftway thereof, a movable substantially semi-circular tray having a chordal side, carried by said car and receptive of an article, a shelf at each level, a substantially semi-circular tray having a chordal side movably supported on the shelf and means to interchange one tray for the other.

3. In a dumb-waiter, a car movable from one level to another in the shaftway thereof, a movable substantially semi-circular tray having a chordal side carried by said car and receptive of an article, a shelf at each level, a substantially semi-circular tray having a chordal side, movably supported on the shelf and means to interchange one tray for the other, said means including substantially radial arms adapted to engage and push against a portion of the chordal side of each tray.

4. In a dumb-waiter, a car movable from one level to another in the shaftway thereof, a movable substantially semi-circular tray having a chordal side carried by said car and receptive of an article, a shelf at each level, a substantially semi-circular tray having a chordal side movably supported on the shelf and means to interchange one tray for the other, said means including substantially radial arms adapted to first rotate in a semi-circular path to engage and push against a portion of the chordal side of each tray and then to move the arms in a horizontal plane whereby the tray transferred to the car is properly positioned therein.

5. Means to transfer a tray from one support to another comprising a shaft, means to rotate the shaft first in one direction then in the other, a pre-settable bail pivotally carried by the shaft, a collar provided with diametrically opposed lugs and freely mounted on the shaft, dog means to retain the collar in one of two positions, means on the bail adapted when the shaft is rotated, to first act against the dog means to free the collar for rotation and then to engage one of the collar lugs to impart the rotation of the shaft to the collar, a transfer member mounted for rotation with the collar and arms on the transfer member engageable in the tray to effect a transfer thereof.

6. Means to transfer a tray from one support to another comprising a shaft, means to rotate the shaft first in one direction and then in the other, a pre-settable bail pivotally carried by the shaft, a collar provided with diametrically opposed lugs and freely mounted on the shaft, dog means to retain the collar in one of two positions, means on the bail adapted when the shaft is rotated in one direction, to first act against the dog means to free the collar for rotation and then to engage one of the collar lugs to impart the rotation of the shaft to the collar, a transfer member mounted for rotation with the collar, arms on the transfer member initially positioned at one side of the center of the shaft and engageable against the tray to effect the transfer thereof, at which time the arms assume a position to the other side of said shaft and means carried by the shaft to move the arms back to their initial position when the shaft is oppositely rotated.

7. In a dumb-waiter having means to transfer a tray between the car and an upper level, a tray supporting shelf at the level, a spring tensioned member underneath the shelf means to position the car in proper relation to said shelf during the transferring cycle, said means comprising a member adapted to be introduced between the shelf and the spring tensioned member.

8. In a dumb-waiter having a shaftway provided with tray bearing shelves and a car provided with tray bearing means, means to interchange the car carried tray with the shelf carried tray at a selected level, means to effect the mentioned interchange, said means comprising means at the bottom of the shaft, and means carried by the car, the last mentioned means being manually operable by a hand wheel associated with the means at the bottom of the shaft.

9. In a dumbwaiter, a car movable from one level to another in a shaftway thereof, a shelf on each level, a substantially semi-circular tray having a chordal side carried by said car, a similar tray movably supported on each shelf, means on the car including rotating arms for simultaneously interchanging the car-carried tray selectively with any of the shelf-carried trays, means associated with each shelf normally to hold its tray against displacement, means on the car to withdraw said displacement-preventing means to allow for the interchange of the trays when the car is at the selected level, said rotating arms being adapted to move forward after rotation to thrust the previously car-carried tray further onto the shelf and then to move backward to thrust the previously shelf-carried tray further onto the car.

10. In a dumbwaiter, a car movable from one level to another in a shaftway thereof, a shelf on each level, a substantially semi-circular tray having a chordal side carried by said car, a similar tray movably supported on each shelf, means on the car including rotating arms for simultaneously interchanging the car-carried tray selectively with any of the shelf-carried trays, said rotating arms being adapted to rotate in a semi-circular path to engage and push against a portion of the chordal side of each tray, and means adapted to move the arms forward in a horizontal plane after rotation to thrust the previously car-carried tray further onto the shelf and then to move backward to thrust the previously shelf-carried tray further onto the car.

11. In a dumbwaiter, a car movable from one level to another in a shaftway thereof, a shelf on each level, a substantially semi-circular tray having a chordal side carried by said car, a similar tray movably supported on each shelf, means on the car including rotating arms for simultaneously interchanging the car-carried tray selectively with any of the shelf-carried trays, means associated with each shelf to normally hold its tray against displacement, means on the car to withdraw said displacement-preventing means to allow for the interchange of the trays when the car is at the particular level, said rotating arms being adapted to rotate in a semi-circular path to engage and push against a portion of the chordal side of each tray, means adapted to move the arms forward in a horizontal plane after rotation to thrust the previously car-carried tray further onto the shelf and then to move backward to thrust the previously shelf-carried tray further onto the car, and means to retract the withdrawing means when the interchange has been effected.

12. In a dumbwaiter having means to interchange similar trays between the car and an upper level, a tray supporting shelf at each level, a spring tensioned member underneath the shelf, upwardly extending lugs on said member normally to extend above the upper surface of the shelf to prevent displacement of the shelf-carried tray, means to position the car in proper relation to such shelf during the interchanging cycle, said means comprising a cam adapted to be introduced between the shelf and the spring tensioned member, and also serving to withdraw said displacement-preventing lugs to allow for the interchange of the trays.

ALBIN SWENSON.